March 29, 1927.

T. D. ADAIR, JR 1,622,897

SPEEDOMETER FASTENING MEANS

Filed Nov. 9, 1925

Witness:
Alfred H. McGlinchey.

Inventor:
T. Donald Adair, Jr.
by his attorneys

Patented Mar. 29, 1927.

UNITED STATES PATENT OFFICE.

1,622,897

THOMAS DONALD ADAIR, JR., OF QUINCY, MASSACHUSETTS, ASSIGNOR TO STANDARD THERMOMETER COMPANY, OF PORTLAND, MAINE, A CORPORATION OF MAINE.

SPEEDOMETER-FASTENING MEANS.

Application filed November 9, 1925. Serial No. 68,039.

The present invention relates to an improvement in speedometer fastening means.

The object of the invention is to provide a simple, inexpensive and compact means for fastening a speedometer or other instrument to the instrument board of an automobile.

In some automobiles, particularly in the Ford, the space behind the instrument board is small, as a consequence of which the means by which instruments are secured in the board must be compact as well as simple and inexpensive. The present invention consists in the improved fastening for speedometers hereinafter described and particularly defined in the claim.

Figure 1:
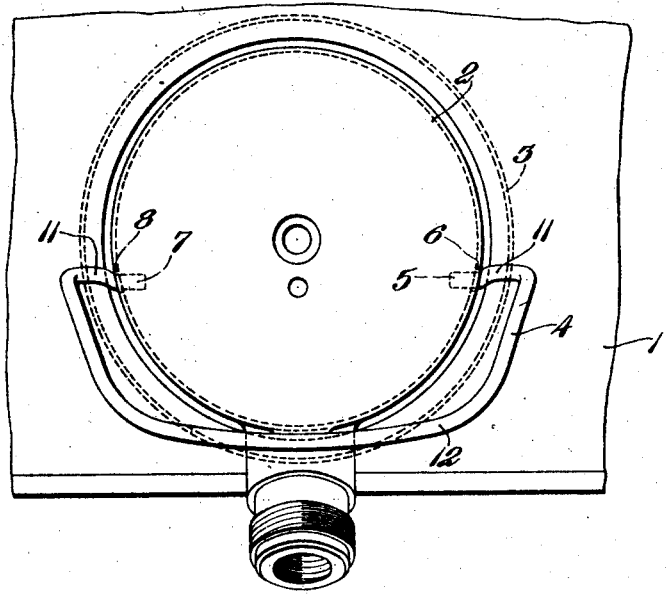
Figure 2:
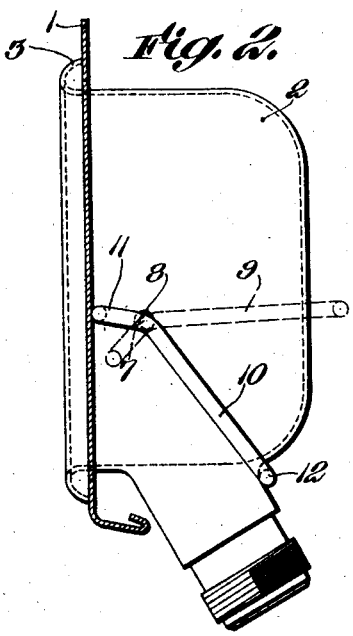

In the accompanying drawings illustrating the preferred form of the invention, Fig. 1 is a rear elevation of a portion of an instrument board, showing the speedometer casing in place; and Fig. 2 is a sectional elevation of the instrument board, showing the device.

The speedometer fastening means illustrated in the accompanying drawings is described as follows: The instrument board 1 consists of the usual sheet metal board extended across the cowl of the body, and is provided with holes to receive the various instruments. The speedometer casing 2 is provided with a lip 3, which takes against the front side of the instrument board 1. The speedometer is inserted through the hole in the instrument board, and a toggle bail 4 is employed to secure it in place. This is done by inserting one of the ends 5 of the toggle bail in one of the holes 6 in the speedometer casing to receive it. The other end 7 of the toggle bail is inserted in the other hole 8 of the casing, with the toggle bail occupying the position shown in dotted lines at 9. The speedometer casing is then adjusted to the desired position in the hole in the instrument board, which is slightly larger than the body of the casing, and held in place while the bail is moved from the position shown in dotted lines at 9 to the position shown in full lines at 10. Between the ends 5 and 7, the bail extends outwardly from the hole, thence laterally to the instrument board at 11, and thence up to form the bail embracing the speedometer.

The toggle bail comprises essentially a lever pivoted on the ends 5 and 7, having two short arms 11, 11, and one long arm 12, by which the bail is turned in order to clamp the speedometer in place. The toggle bail is made of sufficiently large sized wire so that a substantial pressure is required to move the bail from the position shown at 9 to the position shown at 10, as a result of which the bail and the instrument board itself are subjected to slight distortion which, after the bail has been moved to the position shown at 10, is sufficient to hold it in the clamping position. The bail has a toggle or cam action, and it is very simple and inexpensive in form, and secure in its holding qualities. It is not only easily put in place, but it is easily removed when it is desired to take the instrument out of the board for repair or replacement. Thus, by simply throwing the bail from the position 10 to the position 9, the fastening means are loosened, whereupon one end of the bail may be sprung out of the hole in the speedometer casing, and it may be swung upon the other end remaining in the other hole in the casing until that also may be removed from the casing, whereupon it may be entirely removed from engagement with the speedometer, and the latter is free to be taken out of the instrument board.

It is to be understood that while, in the claim, the word "speedometer" has been used to define the instrument which is held by the fastening means forming the subject of this invention, the particular instrument which is fastened by this means is of no significance, and that the word "speedometer" is intended to cover any instrument which it may be desired to secure in the instrument board of an automobile, or in any other instrument board where it is desired to secure an instrument in place. Thus, it is available for use in holding a clock, or a gasoline gauge, or an oil gauge, or any other instrument in place in the instrument board of an automobile, or it may be used to hold a tachometer in place in a sheet metal or other instrument board on a stationary support, or for holding any other instrument in place upon any board to which it is desired to attach it.

Having thus described the invention, what is claimed is:

Speedometer fastening means for securing a speedometer in an instrument board having, in combination, an instrument casing provided with pivot holes, a a toggle bail comprising a bail-shaped piece of wire having two cam portions and pivot ends, the cam portions extending beyond the pivot portions, being adapted to be sprung into and removed from engagement with pivot holes in the casing, the length of the leverages of the parts being such that after the instrument casing is put in place in the instrument board the bail may be sprung into place with its pivots in the pivot holes in the instrument casing, and then turned to clamp the casing in position on the board.

In testimony whereof I have signed my name to this specification.

T. DONALD ADAIR, Jr.